United States Patent
Ning et al.

(10) Patent No.: US 9,477,757 B1
(45) Date of Patent: Oct. 25, 2016

(54) LATENT USER MODELS FOR PERSONALIZED RANKING

(75) Inventors: Huazhong Ning, San Jose, CA (US); Zhen Li, Urbana, IL (US); Hrishikesh Aradhye, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 673 days.

(21) Appl. No.: 13/517,767

(22) Filed: Jun. 14, 2012

(51) Int. Cl.
*G06F 17/30* (2006.01)

(52) U.S. Cl.
CPC .............. *G06F 17/30864* (2013.01)

(58) Field of Classification Search
CPC ............ G06F 17/30864; G06F 17/30867; G06F 17/3071
USPC .......................... 707/723, 737, 739
See application file for complete search history.

(56) References Cited

U.S. PATENT DOCUMENTS

| | | | |
|---|---|---|---|
| 6,687,696 B2 | 2/2004 | Hoffmann et al. | |
| 7,328,216 B2 | 2/2008 | Hoffmann et al. | |
| 7,587,391 B1 | 9/2009 | Bostock et al. | |
| 8,037,080 B2* | 10/2011 | Koren .......................... | 707/754 |
| 8,386,488 B2* | 2/2013 | Jones et al. .................. | 707/738 |
| 2002/0107853 A1* | 8/2002 | Hofmann .......... | G06F 17/30699 |
| 2009/0055139 A1 | 2/2009 | Agarwal et al. | |
| 2009/0083126 A1 | 3/2009 | Koren et al. | |
| 2010/0100416 A1 | 4/2010 | Herbrich et al. | |
| 2011/0035379 A1 | 2/2011 | Chen et al. | |
| 2011/0179081 A1* | 7/2011 | Ovsjanikov et al. ......... | 707/780 |
| 2011/0184806 A1 | 7/2011 | Chen et al. | |
| 2011/0238608 A1* | 9/2011 | Sathish ................... | G06Q 30/02 706/47 |

OTHER PUBLICATIONS

Sargin, Mehmet Emre, and Aradhye, Hrishikesh, Boosting Video Classification Using Cross-Video Signals, IEEE 2011, pp. 1805-1808, Google Inc.
Expectation—maximization algorithm, website, May 29, 2012, en.wikipedia.org/wiki/Expectation-maximization_algorithm, Wikipedia Foundation, Inc.

* cited by examiner

*Primary Examiner* — Rehana Perveen
*Assistant Examiner* — Loc Tran
(74) *Attorney, Agent, or Firm* — Lowenstein Sandler LLP (57) ABSTRACT

A method includes generating a ranking model and a baseline mixing weight for each latent user category from a plurality of latent user categories based on a community preference dataset and one or more latent variables that relate the users from the community of users to the latent user categories. The method also includes generating a personalized mixing weight for each latent user category for a specified user based on an individual preference dataset, the ranking models for the latent user category, and one or more latent variables that relate the specified user to the latent user categories. The method also includes adjusting the personalized mixing weight for each latent user category for the specified user based on the baseline mixing weights, and generating ranking output for at least some objects from the plurality of objects using the personalized mixing weights and the ranking models.

6 Claims, 5 Drawing Sheets

LATENT USER MODELS FOR PERSONALIZED RANKING

BACKGROUND

Ranking is a very popular machine learning problem that is applied in many contexts. Ranking can be applied to, for example, the restaurants in a city, a list of videos, a list of songs, etc. This problem can be solved by using machine learning technologies to learn a ranking model from a training dataset. One example of a training dataset is a set of ground truth pairs $(x_i^{(1)}, x_i^{(2)})$, where $x_i^{(1)}$ is "better" than $x_i^{(2)}$, where each sample $x_i$ is a restaurant, video, song, etc. Given a new list of samples, the ranking model can predict a score for each of them, and the list can be ranked according to the ranking score.

Some ranking problems attempt to make predictions about subjective tastes. For example, user preferences regarding videos tend to be very subjective. A person who owns a dog might prefer to watch funny videos about dogs while a cat owner might prefer to watch funny videos about cats. For these kinds of ranking problems, personalized ranking models, which attempt to take user preference into consideration when learning the ranking model, may perform better than generalized ranking models.

Some existing personalized ranking algorithms treat personalized ranking problems in the same manner as general ranking problems, except that they extend the ground truth pairs to $(x_i^{(1)}+user_j, x_i^{(2)}+user_j)$, and learn a global ranking model for all users. In these types of systems: 1) the model size must be very big to be discriminative enough for each user if the number of users is large-scale; and 2) a large number of training samples are needed if the user information is very limited. In real systems, it is common for the user information to be limited, because many users do not log in and the systems fail to accumulate user information.

Other existing personalized ranking algorithms first cluster the users into categories and then learn a smaller ranking model for each category of users. When the user information is limited, however, it is difficult to extract good user features for clustering.

SUMMARY

The disclosure relates to personalized ranking.

One aspect of the disclosed embodiments is a method that includes accessing a community preference dataset representing the preferences of a community of users regarding a plurality of objects. The community preference dataset includes a plurality of paired comparisons regarding the plurality of objects. The method also includes generating a ranking model and a baseline mixing weight for each latent user category from a plurality of latent user categories based on the community preference dataset and one or more latent variables that relate the users from the community of users to the latent user categories. The method also includes accessing an individual preference dataset representing the preferences of a specified user regarding at least some objects from the plurality of objects. The method also includes generating a personalized mixing weight for each latent user category for the specified user based on the individual preference dataset, the ranking models for the latent user category, and one or more latent variables that relate the specified user to the latent user categories. The method also includes adjusting the personalized mixing weight for each latent user category for the specified user based on the baseline mixing weight for each latent user category, and generating ranking output for at least some objects from the plurality of objects using the personalized mixing weights and the ranking models for the latent user categories.

Another aspect of the disclosed embodiments is a method that includes accessing a community preference dataset representing the preferences of a community of users regarding a plurality of objects, and generating a ranking model and a baseline mixing weight for each latent user category from a plurality of latent user categories based on the community preference dataset. The method also includes accessing an individual preference dataset representing the preferences of a specified user regarding at least some objects from the plurality of objects, and generating a personalized mixing weight for each latent user category for the specified user based on the individual preference dataset and the ranking model for the latent user categories.

Another aspect of the disclosed embodiments is an apparatus that includes one or more processors and one or more memory devices for storing program instructions used by the one or more processors. The program instructions, when executed by the one or more processors, cause the one or more processors to access a community preference dataset representing the preferences of a community of users regarding a plurality of objects, generate a ranking model and a baseline mixing weight for each latent user category from a plurality of latent user categories based on the community preference dataset, access an individual preference dataset representing the preferences of a specified user regarding at least some objects from the plurality of objects, and generate a personalized mixing weight for each latent user category for the specified user based on the individual preference dataset and the ranking model for the latent user categories.

BRIEF DESCRIPTION OF THE DRAWINGS

The description herein makes reference to the accompanying drawings wherein like reference numerals refer to like parts throughout the several views, and wherein.

DETAILED DESCRIPTION

The disclosure herein relates to personalized ranking using latent user models. A community of users can be characterized as belonging to a plurality of latent user categories, and a ranking model can be learned for each latent user category. Each latent user category represents a specific subjective user preference or combination of subjective user preferences. In practice, individual user preferences do not generally conform to a single latent user category, but instead resemble a mixture of the latent user categories.

The systems and methods described herein do not attempt to explicitly assign users to categories. Instead, the relationships between users and categories are treated as latent variables. Latent variables describe data that is treated as being unknown. Using mathematical models, the values of the latent variables are inferred using known data.

The systems and methods described herein generate a personalized ranking model in two stages. In a baseline modeling stage, ranking models for the latent user categories and baseline mixing weights are determined using a community preference dataset representing the preferences of a community of users regarding a plurality of objects as training data. In a personalized modeling stage, personalized mixing weights for a specified user are determined using an individual preference dataset representing the preferences of the specified user, and also using the previously determined ranking models for the latent user categories. The personalized ranking model, which is defined by the personalized mixing weights in combination with the ranking models for the latent user categories, is applied in a ranking stage, for example, to generate ranking output, such as ranking scores or a ranking order, in response to a query.

Figure 1:
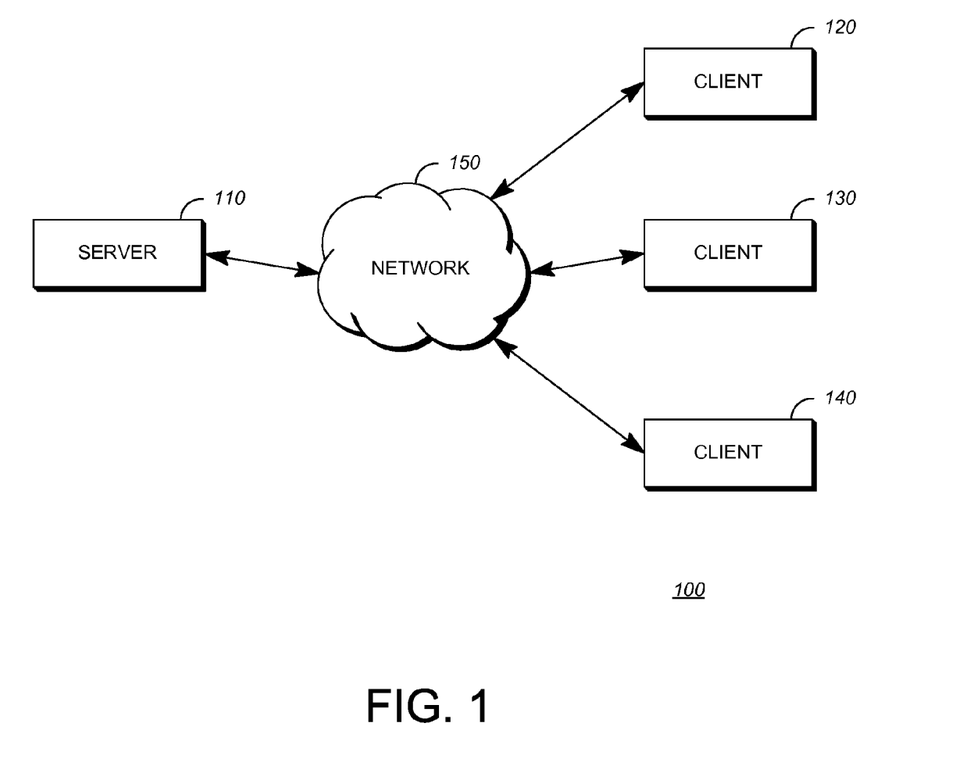
FIG. 1 is a block diagram of a system according to one implementation of personalized ranking.

FIG. 1 is a block diagram of a system 100 in accordance with one implementation. The system 100 can include one or more server computers such as a server 110, and one or more client devices such as client 120, client 130, and client 140. The server 110 and the clients 120, 130, 140 can be in communication with one another by a network 150.

The clients 120, 130, 140 are representative, and it is understood that very large numbers (e.g., millions) of clients can be supported and can be in communication with the server 110 at any time. The clients 120, 130, 140 may include a variety of different computing devices. Examples include personal computers, digital assistants, personal digital assistants, cellular phones, mobile phones, smart phones, laptop computers, and other types of computing devices now-existing or hereafter developed.

The network 150 is typically the Internet, but may also be any network, including but not limited to a LAN, a MAN, a WAN, a mobile, wired or wireless network, a private network, a virtual private network, and combination of these types of networks and/or other types of networks.

Figure 2:
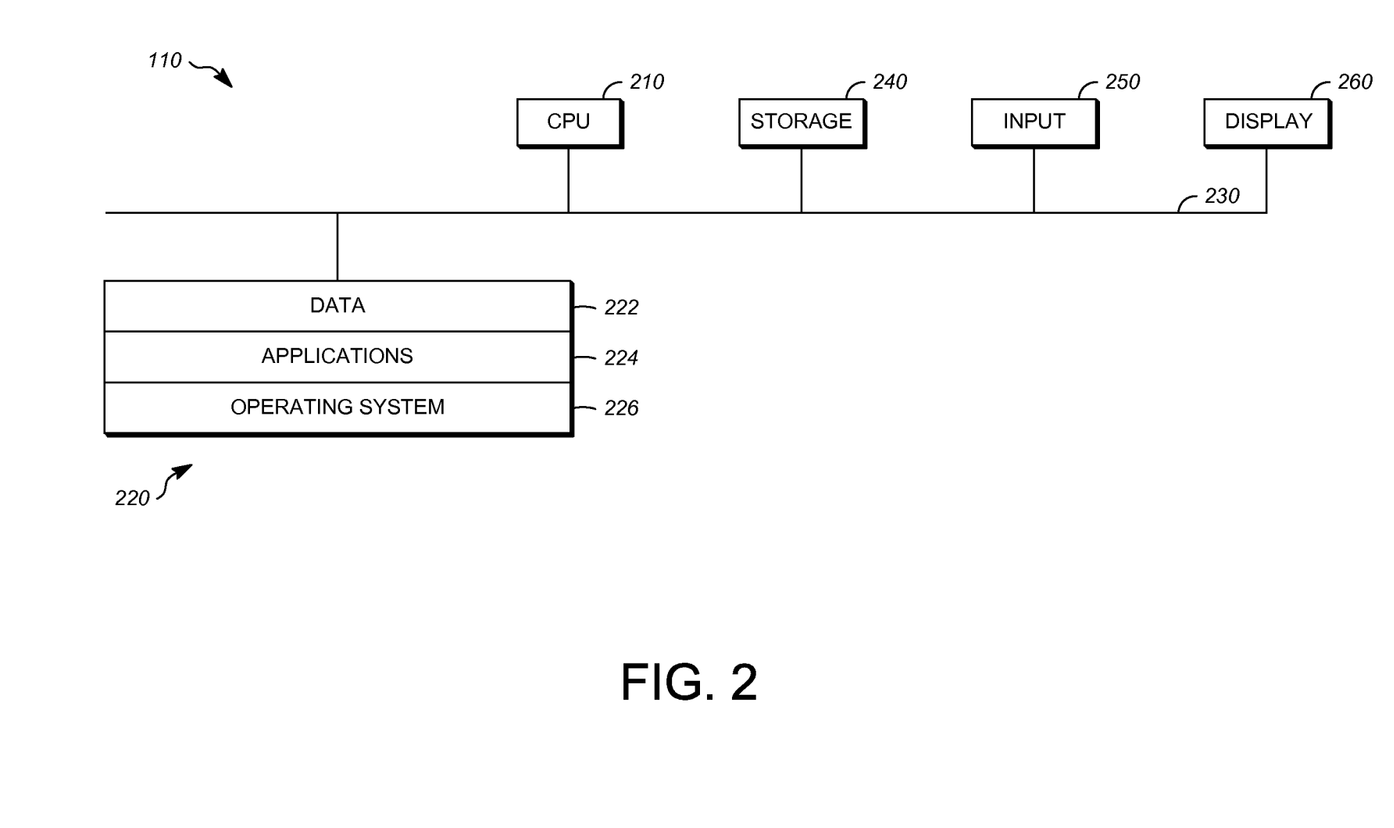
FIG. 2 is a block diagram showing an example of a hardware configuration for a server.

FIG. 2 is a block diagram of an example of a hardware configuration for the server 110. The clients 120, 130, 140 can, in some implementations, use a similar hardware configuration.

The server 110 can include a CPU 210. The CPU 210 of the server 110 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The server 110 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include programs that permit the CPU 210 to perform the methods described here.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of the server 110 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines performing the operations of the server 110. Although depicted here as a single bus, the bus 230 of the server 110 can be composed of multiple buses. Further, the storage device 240 can be directly coupled to the other components of the server 110 or can be accessed via a network and can comprise a single integrated unit such as a memory card or multiple units such as multiple memory cards. The server 110 can thus be implemented in a wide variety of configurations.

Figure 3:
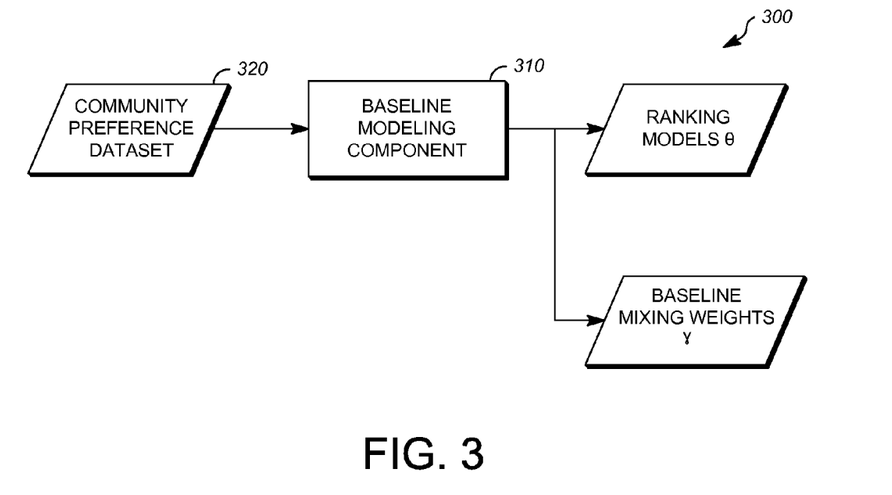
FIG. 3 is a block diagram showing an example of a baseline modeling stage.

FIG. 3 is a block diagram showing an example of a baseline modeling stage 300. In the baseline modeling stage 300, a baseline modeling component 310 receives a community preference dataset 320 as an input. For example, if the baseline modeling component 310 is a software component that is executed by the server 110, the community preference dataset 320 can be received as an input by accessing it at the memory 220, the storage device 240, or at any other device, system, or media on which it is stored. As outputs, the baseline modeling component 310 generates ranking models $\theta$ and baseline mixing weights $\gamma$.

In the baseline modeling stage 300, the ranking models $\theta$ and the baseline mixing weights $\gamma$ are jointly optimized by the baseline modeling component 310 based on the community preference dataset 320 using machine learning techniques. The baseline modeling component 310 can be implemented as a software component that is executed by the server 110.

The community preference dataset 320 serves as a training dataset for the baseline modeling component 310, and represents the preferences of a community of users regarding a plurality of objects. The community of users can be, for example, the users of the clients 120, 130, 140 as well as additional client devices. The objects can be any type of objects to which personalized ranking is to be applied. The objects can be, for example, video clips, audio files, documents, etc. The information in the community preference dataset 320 can be collected based on user behavior or explicit rankings or comparisons, which are collected and scored with permission from the users. The identities of the individual users from whom the preferences were derived can be anonymized or omitted from the community preference dataset 320.

The community preference dataset 320 can include or be used as a basis for generating paired comparisons. As an example, the community preference dataset can include N paired comparisons, $x_i = (x_i^{(1)}, x_i^{(2)})$ for $i \in \{1, \ldots, N\}$. Each comparison consists of two samples, where $x_i^{(1)}$ is regarded as "better" than $x_i^{(2)}$.

Each comparison $x_i$ was made by an individual user. The comparisons could be made explicitly. For example, if a user selects an option from a list of options, this selection can be used to generate a set of paired comparisons, each indicating that the selected option is preferred over one of the other options. Alternatively, the comparisons could be made implicitly, based on data that does not represent an explicit comparison of an object to one or more other objects. For example, in a system where a user ranks objects on a scale from 1 to 5, these rankings could be used to generate a comparison for each pair of ranked objects having a non-equal ranking.

As used herein "community of users" and similar terms refer to the users whose preferences are included in the community preference dataset 320. Assuming that the community of users includes a total of M users, then $u_i \in \{1, \ldots, M\}$ denotes the user that made the $i^{th}$ comparison.

The baseline modeling component 310 assumes that the users can be roughly characterized by K categories, each focusing on a different type of subjective preference or set of subjective preferences. For instance, user category K=1 could represent users who consistently favor videos that feature funny babies, while user category user category K=2 could represent users who consistently favor prank videos.

The ranking models θ can be machine-learned ranking models. As used herein, ranking model is synonymous with ranking function. The baseline modeling component 310 can learn a ranking model θ to represent each category of users, where ranking model $θ_k$ is the ranking model that corresponds to the $k^{th}$ category.

The baseline modeling component 310 assumes that each user behaves as a mixture of the K user categories. Herein, mixing weight $γ_{jk}$ represents the mixing weight for the $j^{th}$ user on the $k^{th}$ user category. The sum of the mixing weights $γ_{jk}$ is equal to one, as in Equation 1:

$$\sum_{k=1}^{K} γ_{jk} = 1 \qquad \text{[Equation 1]}$$

The mixing weights $γ_{jk}$ can be treated as a prior probability of a particular latent user category when the user is known, as in Equation 2:

$$γ_{jk} = p(\text{user category}=k|\text{user}=j) \qquad \text{[Equation 2]}$$

The user category corresponding to each user is treated as a latent variable. Thus, the categories are treated as latent user categories, meaning that the users are not explicitly grouped into categories, but rather, the relationship between the users and the latent user categories is determined using machine learning techniques, as will be explained further herein.

The baseline modeling component 310 utilizes machine learning techniques. In some implementations, the baseline modeling component 310 learns the ranking models $θ_k$ and the mixing weights $γ_{jk}$ for $k=1, \ldots, K$ and $j=1, \ldots, M$ jointly, by maximizing the log-likelihood of the probability that a user $u_i$ agrees with preference $x_i$, per Equation 3:

$$\log \prod_{i=1}^{N} p(x_i, u_i) \qquad \text{[Equation 3]}$$

In order to maximize this log-likelihood, a latent variable, $z_i \in \{1, \ldots, K\}$ is introduced. As an illustration, in a ranking procedure where a user j is given the $i^{th}$ pair to rank; the user first randomly draws a $z_i$ based on a multinomial distribution of $[γ_{j1}, γ_{j2}, \ldots, γ_{jK}]$. Based on the value of $z_i$, the user will choose the corresponding ranking function $θ_k$ to rank. The latent variable $z_i$ can be introduced, for example, as described in Equation 4:

$$p(x_i, u_i) = \sum_{k=1}^{K} p(x_i, u_i, z_i = k) = \qquad \text{[Equation 4]}$$

$$\sum_{k=1}^{K} p(x_i | z_i = k) p(z_i = k | u_i) p(u_i) = p(u_i) \sum_{k=1}^{K} p(x_i | θ_k) γ_{u_i,k}$$

Per Equation 4, maximizing equation 3 is performed by finding appropriate values for the ranking models $θ_k$ and the mixing weights $γ_{jk}$, which can be performed by the baseline modeling component 310 using machine learning techniques.

In one implementation, the baseline modeling component 310 can utilize the expectation-maximization (EM) algorithm to find the optimal or suboptimal ranking models $θ_k$ and the baseline mixing weights $γ_{jk}$. The EM algorithm is an iterative method for finding maximum likelihood or maximum a posteriori (MAP) estimates of parameters in statistical models, where the model depends on unobserved latent variables. The EM iteration alternates between performing an expectation (E) step, which computes the expectation of a log-likelihood evaluated using the current estimate for the parameters, and a maximization (M) step, which computes parameters maximizing the expected log-likelihood found on the E step. These parameter-estimates are then used to determine the distribution of the latent variables in the next E step. This process is performed iteratively until convergence is reached.

The baseline modeling component 310 can perform the E step by estimating the posterior probability that the latent variable $z_i$ identifies a specified latent user category k for a given preference $x_i$ and user $u_i$, as in Equation 5:

$$p(z_i = k | x_i, u_i) \qquad \text{[Equation 5]}$$

The posterior probability given by Equation 5 can be estimated per Equation 6, which incorporates the latent variable $z_i$ in the manner described by Equation 4:

$$α_{ik} = \qquad \text{[Equation 6]}$$

$$p(z_i = k | x_u, u_i) = p(z_i = k, x_i u_i) / \sum_{k=1}^{K} p(z_i = k, x_i, u_i) =$$

$$p(x_i | θ_k) γ_{u_i,k} / \sum_{k=1}^{K} p(x_i | θ_k) γ_{u_i,k}$$

The baseline modeling component 310 can perform the M step by first re-estimating the mixing weights $γ_{jk}$. This can be done, for example, per Equation 7:

$$γ_{jk} = \sum_{i:u_i=j} α_{ik} / \sum_{k=1}^{K} \sum_{i:u_i=j} α_{ik} \qquad \text{[Equation 7]}$$

As part of the M step, the baseline modeling component 310 next re-estimates the ranking models $θ_k$. Each of the ranking models $θ_k$ can be estimated, for example, per Equation 8:

$$\max \sum_{i=1}^{N} α_{ik} \log p(x_i | θ_k) = \max \sum_{i=1}^{N} α_{ik} \log[1/(1 + \exp(-f_k(x_i)))] \qquad \text{[Eqaution 8]}$$

In Equation 8, any desired type of ranking models can be utilized. As one example, linear ranking models can be utilized, as in Equation 9, where $x_i$ is an object to be ranked, in which case, Equation 8 becomes a weighted version of logistic regression, which can be solved by well-known methods.

$$f_k(x_i) = w_k^T(x_i^{(1)} - x_i^{(2)})$$ [Equation 9]

The E step and the M step are repeated iteratively until convergence. Upon convergence, the ranking models θ and the baseline mixing weights γ can be stored for later use, for example, at the memory 220 of the server 110.

Figure 4:
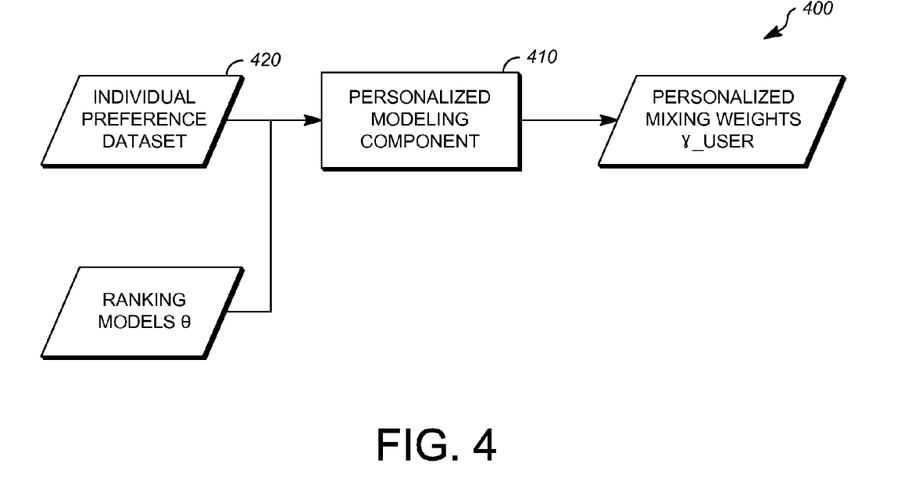
FIG. 4 is a block diagram showing an example of a personalized modeling stage.

FIG. 4 is a block diagram showing an example of a personalized modeling stage 400. In the personalized modeling stage 400, a personalized modeling component 410 can receive an individual preference dataset 420 as an input. The individual preference dataset 420 corresponds to a specified user, and represent the preferences of the specified user regarding at least some objects from the plurality of objects that form the subject matter of the comparisons in the community preference dataset 320. The specified user can be the user of one of the clients 120, 130, 140. The preferences of the specified user can be incorporated both in the individual preference dataset 420 and the community preference dataset 320. In some implementations, the individual preference dataset can be a subset of the community preference dataset 320.

The data that is incorporated in the individual preference dataset 420 is collected and stored with permission from the user. The individual preference dataset 420 and ranking functions that utilize it can be associated with a password-protected or otherwise secured profile to protect the user's privacy.

The personalized modeling component can also receive the ranking models θ from the baseline modeling stage 300 as inputs. For example, if the personalized modeling component 410 is a software component that is executed by the server 110, the individual preference dataset 420 and the ranking models θ can be received as inputs by accessing them at the memory 220, the storage device 240, or at any other device, system, or media on which they are stored. As outputs, the personalized modeling component 410 generates personalized mixing weights γ_user that correspond to the specified user.

In the personalized modeling stage 400, the ranking models θ are held constant. The personalized mixing weights γ_user are optimized by the personalized modeling component 410 based on the individual preference dataset 420 using machine learning techniques. The personalized modeling component 410 can be implemented as a software component that is executed by the server 110.

As an example, the personalized modeling component 410 can generate the personalized mixing weights γ_user using the expectation maximization algorithm. Generally, this process is as described in the baseline modeling stage 300. The E step can be performed in the same manner as in the baseline modeling stage 300, for example, according to Equation 6. In the M step, the personalized modeling component 410 re-estimates the personalized mixing weights γ_user. The personalized modeling component 410 does not re-estimate the ranking models θ as part of the M step, and instead, holds them constant. As in the baseline modeling stage 300, the E step and the M step are performed until convergence. Subsequently, the personalized mixing weights γ_user can be stored for later use, for example, at the memory 220 of the server 110.

Figure 5:
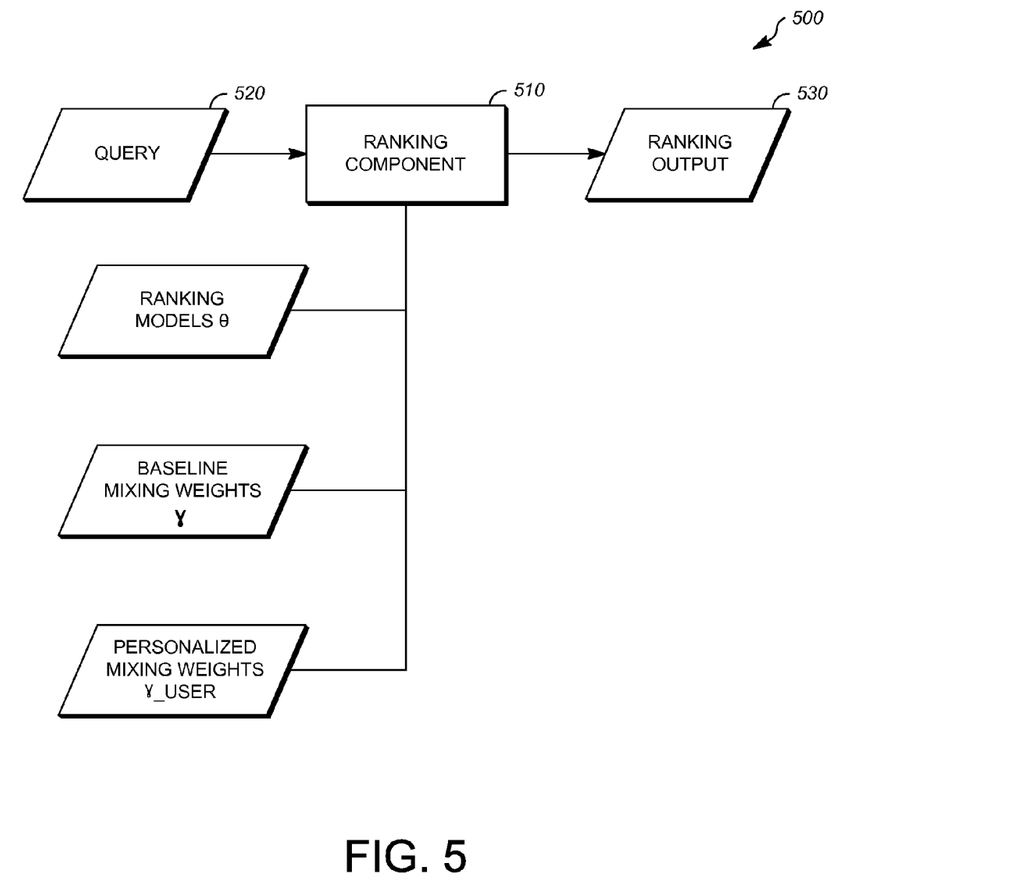
FIG. 5 is a block diagram showing an example of an implementation of a ranking stage.

FIG. 5 is a block diagram showing an example of a ranking stage 500. In the ranking stage 500, a ranking component 510 receives a ranking request regarding the specified user, such as a query 520, as an input, and generates a ranking output 530. The query 520 can be a stimulus in any form that causes operation of the ranking component 510. The query 520 can be generated in response to user input, or can be generated programmatically. The query 520 can specify parameters that are utilized for the purposes of ranking, such as keywords or a list of objects to be ranked.

The ranking component 510 generates the ranking output 530 in response to the query 520 using the ranking models θ, which are received by the ranking component 510, such as by accessing them at the memory 220 of the server 110. If the personalized mixing weights γ_user do not yet exist for the specified user, the ranking component 510 can utilize the baseline ranking model, which is defined by applying the baseline mixing weights γ to the ranking models θ. This can be the case, for example, if the specified user has not previously been seen by the system, or if there is not sufficient data available in the individual preference dataset 420 for the specified user. In cases where the personalized mixing weights γ_user are based on a well-developed set of data in the individual preference dataset 420, the ranking component 510 can utilize the personalized ranking model, which is defined by applying the personalized mixing weights γ_user to the ranking models θ.

Using either the baseline mixing weights γ or the personalized mixing weights γ_user, the ranking output 530 is generated by first computing model-specific ranking scores for a selected object $x_i$ using each of the ranking models θ. The model specific ranking scores are then weighted according to the baseline mixing weights γ or the personalized mixing weights γ_user, and combined. For example, the model specific ranking scores can be combined as a weighted sum or weighted average of either of the baseline mixing weights γ or the personalized mixing weights γ_user.

If the data in the individual preference dataset 420 is limited, the personalized mixing weights γ_user can be used by the ranking component 510 to produce the ranking output 530 by applying smoothing techniques and/or smoothing algorithms. These smoothing techniques or algorithms can be based in part on the baseline mixing weights γ. The personalized mixing weight γ_user for each latent user category can be adjusted based on the baseline mixing weights γ. The magnitude of the adjustment can be based on, for example, the size of the individual preference dataset. As one example, the personalized mixing weights γ_user can be modified based on a weighted average of the baseline mixing weights γ and the personalized mixing weights γ_user, where the weighting is based on the number of comparisons or other data elements in the individual preference dataset 420 relative to a threshold value.

From the foregoing, it will be appreciated that the baseline ranking model can be adopted for a newly seen user. As data regarding the newly seen user is collected, it is added to the individual preference dataset 420 for that user. The personalized ranking model for that user can then be phased in gradually as the individual preference dataset 420 regarding the user grows.

Figure 6:
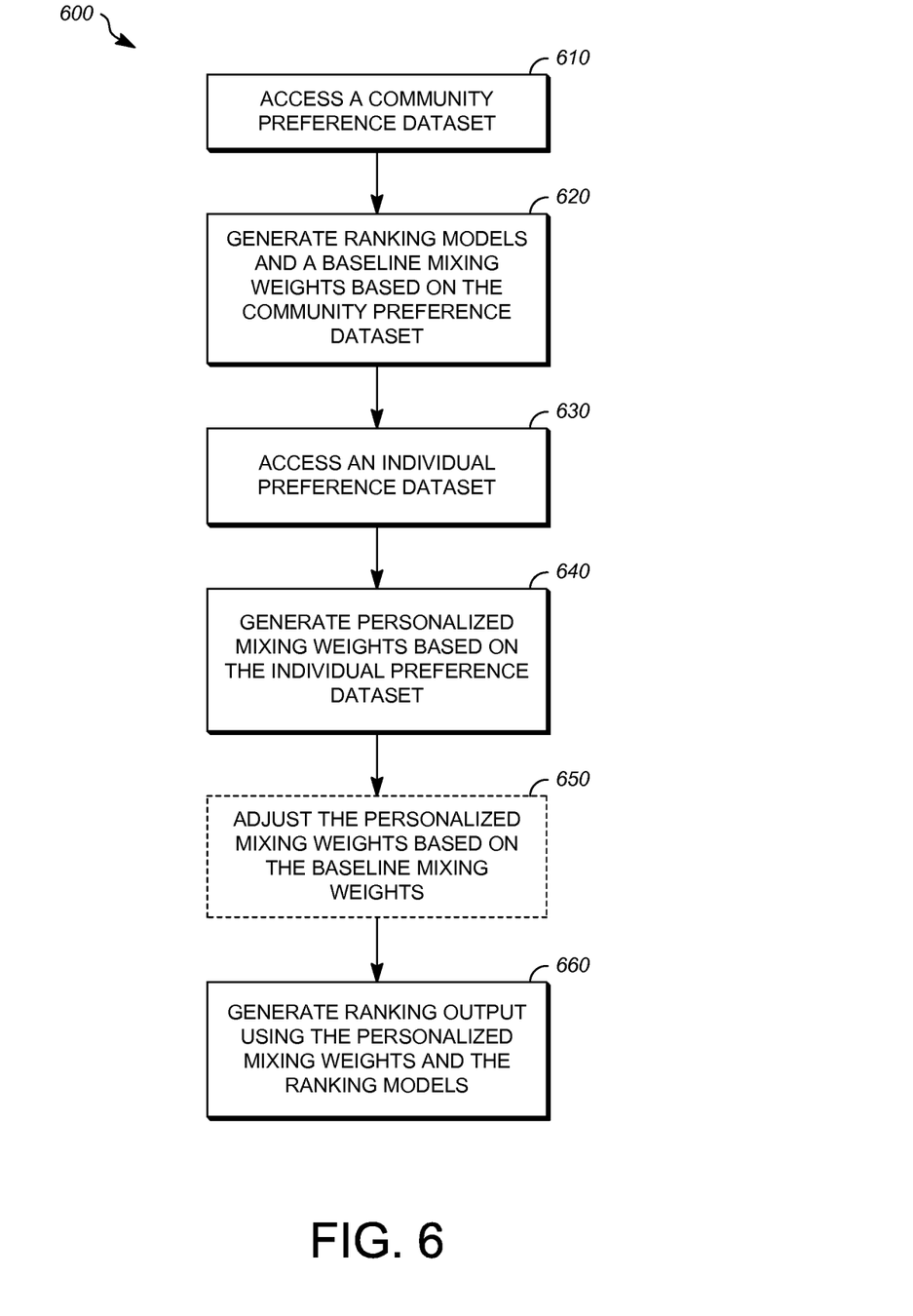
FIG. 6 is a flowchart showing a process for personalized ranking.

FIG. 6 is a flowchart showing an example of a process 600 for personalized ranking. The operations described in connection with the process 600 can be performed at one or more server computers, such as the server 110. When an operation is performed by one or more computers, it is completed when it is performed by one computer. The operations described in connection with the process 600 can be embodied as a non-transitory computer readable medium including program instructions executable by one or more processors that, when executed, cause the one or more processors to perform the operations. For example, the operations described in connection with the process 600 could be stored at the memory 220 of the server 110 and be executable by the CPU 210 of the server 110.

Operation 610 includes accessing a community preference dataset that represents the preferences of a community of users regarding a plurality of objects. The community preference dataset can includes a plurality of paired comparisons regarding the plurality of objects. Accessing can occur in any suitable manner, such as accessing by transmission over a network, accessing from memory, or accessing from a disc. In one example, the CPU 210 of the server 110 accesses the community preference dataset 320 from the memory 220 of the server 110.

Operation 620 includes generating a ranking model and a baseline mixing weight for each latent user category from a plurality of latent user categories based on the community preference dataset and one or more latent variables that relate the users from the community of users to the latent user categories. In one example, the CPU 210 of the server 110 generates the ranking model and a baseline mixing weights in the manner described in connection with the baseline modeling component 310, which can be implemented in the form of computer program instructions that are executed at the CPU 210 of the server 110.

Operation 630 includes accessing an individual preference dataset that represents the preferences of a specified user regarding at least some objects from the plurality of objects. The individual preference dataset can includes a plurality of paired comparisons regarding at least some objects from the plurality of objects. Accessing can occur in any suitable manner, such as accessing by transmission over a network, accessing from memory, or accessing from a disc. In one example, the CPU 210 of the server 110 accesses the individual preference dataset 420 from the memory 220 of the server 110.

Operation 640 includes generating a personalized mixing weight for each latent user category for the specified user based on the individual preference dataset, the ranking models for the latent user category, and one or more latent variables that relate the specified user to the latent user categories. In one example, the CPU 210 of the server 110 generates the personalized mixing weights in the manner described in connection with the personalized modeling component 410, which can be implemented in the form of computer program instructions that are executed at the CPU 210 of the server 110.

Operation 650, which is optional, includes adjusting the personalized mixing weight for each latent user category for the specified user based on the baseline mixing weight for each latent user category. Operation 650 can be performed, for example, when the individual preference dataset 420 that is used to generate the personalized mixing weights does not include sufficient data from which to generate an accurate personalized ranking model. Operation 650 can be performed, for example, by the CPU 210 of the server 110 in the manner described in connection with the ranking component 510, which can be implemented in the form of computer program instructions that are executed at the CPU 210 of the server 110.

Operation 660 includes generating ranking output for at least some objects from the plurality of objects using the personalized mixing weights and the ranking models for the latent user categories. Operation 660 can be performed, for example, by the CPU 210 of the server 110 in the manner described in connection with the ranking component 510, which can be implemented in the form of computer program instructions that are executed at the CPU 210 of the server 110.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
accessing a community preference dataset representing preferences of a community of users regarding a plurality of objects, wherein the community preference dataset includes a plurality of user-specified paired comparisons regarding the plurality of objects;
identifying a first user category in the community of users;
generating a ranking model and a baseline mixing weight for the first user category based on the community preference dataset;
accessing an individual preference dataset representing preferences of a first user of the first user category regarding at least one of the plurality of objects;
generating a personalized mixing weight for the first user based on the individual preference dataset and the ranking model for the first user category;
adjusting the personalized mixing weight for the first user based on a weighted average of the baseline mixing weight for the first user category and the personalized mixing weight for the first user, wherein the weighting of the weighted average is based on a size of the individual preference dataset; and
ranking at least two of the plurality of objects based on the adjusted personalized mixing weight for the first user and the ranking model for the first user category.

2. The method of claim 1, wherein the adjusting of the personalized mixing weight comprises applying a smoothing algorithm.

3. The method of claim 1, wherein the generating of the ranking model for the first user category comprises maximizing a log-likelihood:

$$\log \Pi_{i=1}^{N} p(x_i, u_i),$$

wherein $x_i$ is at least one data element from the community preference dataset, $u_i$ is at least one user of the first user category, $p(x_i, u_i)$ is a probability that $x_i$ agrees with $u_i$, and N is a number of data elements in the community preference dataset.

4. An apparatus, comprising:
one or more processors; and
one or more memory devices for storing program instructions used by the one or more processors, wherein the program instructions, when executed by the one or more processors, cause the one or more processors to:
access a community preference dataset representing preferences of a community of users regarding a plurality of objects, wherein the community preference dataset includes a plurality of user-specified paired comparisons regarding the plurality of objects,
identify a first user category in the community of users;
generate a ranking model and a baseline mixing weight for the first user category based on the community preference dataset,
access an individual preference dataset representing preferences of a first user of the first user category regarding at least one of the plurality of objects,
generate a personalized mixing weight for the first user based on the individual preference dataset and the ranking model for the first user category;
adjust the personalized mixing weight for the first user based on a weighted average of the baseline mixing weight for the first user category and the personalized mixing weight for the first user, wherein the weighting of the weighted average is based on a size of the individual preference dataset, and rank at least two of the plurality of objects based on the adjusted personalized mixing weight for the first user and the ranking model for the first user category.

5. The apparatus of claim 4, wherein the adjusting of the personalized mixing weight comprises applying a smoothing algorithm.

6. The apparatus of claim 4, wherein the generating of the ranking model for the first user category comprises maximizing a log-likelihood:

$$\log \Pi_{i=1}^{N} p(x_i, u_i),$$

wherein $x_i$ is at least one data element from the community preference dataset, $u_i$ is at least one user of the first user category, $p(x_i, u_i)$ is a probability that $x_i$ agrees with $u_i$ and N is a number of data elements in the community preference dataset.

\* \* \* \* \*